United States Patent Office 3,565,832
Patented Feb. 23, 1971

3,565,832
POLYMERIZATION OF AROMATIC MONOMERS IN PRESENCE OF LEWIS ACID CATALYST AND OXYGEN
Norman Bilow and John B. Rust, Los Angeles, and Abraham L. Landis, Northridge, Calif., assignors to Hughes Aircraft Company, Culver City, Calif., a corporation of Delaware
No Drawing. Filed Sept. 5, 1967, Ser. No. 665,265
Int. Cl. C08g *33/00*
U.S. Cl. 260—2
6 Claims

ABSTRACT OF THE DISCLOSURE

The disclosure herein concerns a commercially feasible method of preparing aromatic polymers which are fusible and soluble in a variety of solvents. The polymers are prepared by heating a mixture of low molecular weight aromatic hydrocarbons and a strong Lewis acid polymerization catalyst while forcing gaseous oxygen into the heated reaction mixture to form resins of a useful commercial quality and capable of withstanding higher temperatures with a negligible weight loss.

---

The invention relates to methods of producing aromatic polymers, which are fusible and soluble, and thermoset products thereof. More particularly, the invention relates to a method and improvement thereof for producing fusible, soluble aromatic resinous polymers derived from polymerization of low molecular weight aromatic hydrocarbon monomers by a Friedel-Crafts type of reaction, and the products thereof, including improvement in the processing and products. The invention herein described was made in the course of or under a contract or subcontract thereunder with the Air Force.

The definition of the Friedel-Crafts reaction is: "The Friedel-Crafts reaction is commonly considered as a process of uniting two or more organic molecules through the formation of carbon-to-carbon bonds under the influence of certain strongly acidic metal halide catalysts such as aluminum chloride, boron trifluoride, ferric chloride, zinc chloride, etc.," as defined from the Encyclopedia Britannica. The reaction is utilized in synthesis of aromatic hydrocarbons and other aromatic derivatives. However, a Friedel-Crafts type of reaction, to promote the formation of useful fusible, soluble completely aromatic polymers from low molecular weight aromatic hydrocarbon monomers has not heretofore been recognized or disclosed. Polymers have been reported, but they invariably have been partially aliphatic.

It is accordingly, an object of this invention to provide a commercially feasible catalytic method for producing a fusible, soluble aromatic polymers of commercial usage, of thermal stability, and capable of curing to a practical useful resinous state.

Another object of this invention is to provide a catalytic and oxidative method for producing aromatic polymers possessing chemical inertness in their cured form and which are fusible prior to cure and soluble in suitable solvents therefor to provide useful molding, laminating and varnish compositions and from which can be prepared baking varnishes, lacquers and enamels.

It is a further object of this invention to provide commercially useful methods for the production of fusible, soluble, and high-temperature stable aromatic polymers having commercial utility and to provide aromatic resinous materials suitable for molding and laminating compositions, and the products thereof.

Further objects and advantages will become apparent from the following description which is given primarily for purposes of illustration and not to be construed as in any way limiting the spirit and scope of this invention.

As heretofore indicated, this invention is concerned primarily with the production of fusible and soluble aromatic polymers and chemical intermediates, characterized by chemical inertness, and improved thermal stability. The aromatic polymers provided herein are useful and valuable intermediates in composite resin mixtures which may be cured by the application of heat or heat and pressure to produce insoluble and infusible molded articles, as filled or unfilled moldings, laminates, varnishes, baking lacquers, enamels and the like.

The substantially low molecular weight aromatic hydrocarbons that are suitable in the present invention for producing fusible, soluble aromatic resins of high heat stability and chemical inertness are preferably fused ring aromatic hydrocarbons such as naphthalene, anthracene, phenanthrene, or mixtures thereof, and non-fused ring polynuclear aromatic hydrocarbons such as biphenyl, terphenyls, quaterphenyls and isomers thereof including mixtures of the above, mixtures of fused and non-fused ring monomers, and mixtures thereof with other low molecular weight aromatic hydrocarbon monomers and polymers that generally contain not more than five fused and non-fused rings. Exemplary thereof are such polymer or monomer materials as phenyl naphthalene, naphthylbiphenyl, phenylanthracene, and the like, and mixtures of such fused and non-fused ring compounds. These also produce fusible, soluble aromatic polymers of the character herein described. Included in the low molecular weight aromatic hydrocarbons, or mixtures thereof may be other phenylene monomers, polymers or oligomers which contain not more than five aromatic rings and mixtures of such hydrocarbon monomers or polymers with benzene, provided that the proportion of benzene is kept within low limits or relatively low percentage of the reactant materials so that the resulting polymers remain soluble and fusible. In other words, the benzene proportion is kept sufficiently low so that a substantial fraction of the polymers which are obtained are soluble and fusible. The aromatic hydrocarbon monomers utilized in this reaction are preferably non-alkylated, because the alkylated aromatic hydrocarbons in many cases do not possess the requisite thermal stability and chemical inertness required of aromatic resinous polymers in many commercial applications.

In some cases, for example, where thermal resistance is not a particular requirement, alkylated aromatic hydrocarbons can be used in a mixture with non-alkylated aromatic hydrocarbons provided that the portions of alkylated aromatic hydrocarbons are kept sufficiently low so as not to affect the requisite thermal stability and chemical inertness of the final cured product. Thus, while we preferably polymerize such fused ring aromatic compounds as naphthalene, anthracene, phenanthrene, and non-fused ring compounds as biphenyl, terphenyls, quaterphenyls, and mixtures of the same, including mixtures thereof with other aromatic hydrocarbons of not more than five aromatic rings, we may use such mixtures as, for example, naphthalene and biphenyl; naphthalene and terphenyl; anthracene and naphthalene; naphthalene, biphenyl and benzene; naphthalene, terphenyl and toluene; benzene, methylnaphthalene and quaterphenyl; anthracene and quaterphenyl, anthracene and terphenyl, mixtures thereof, and mixtures thereof including other mixtures of any such aromatic components, as herein described.

In commercial application of aromatic hydrocarbon polymers it is essential to use a high-temperature-stable polymer which has an intrinsically high molecular weight or which may be cross-linked, cured, vulcanized and the like to produce a high molecular weight, or an infinite molecular weight, during the said molding and fabrication process. At the same time, it is essential that the polymer be fusible or capable of flow under the conditions of heat and pressure that are used in the said molding and fabrication process and that the uncured polymer be soluble in suitable solvents, as the chlorobenzenes, chloroform, trichloroethylene, dioxane, mixtures thereof, and the like, so that fillers, fibers, and the like can be intimately coated with the polymer prior to the said molding and fabrication process.

The unique use of the Friedel-Crafts type of reaction coupled with the ease of preparation of the resins in good yield by the processes of the present invention, constitutes a significant and major advance in the state-of-the-art of fusible, soluble or tractable aromatic resins. The unique properties are the direct result of the proper choice of monomers, proportion of reactants, and proper use of the Friedel-Crafts reaction conditions in the desired process of the present invention.

Structures produced from the curable aromatic resinous polymers herein described include electrical insulators and structural materials which are required to withstand substantially high temperatures for long periods of time under strenuous conditions of conventional use and abuse. An additional use for the polymers herein provided is for admixture with thermoplastic materials, such as the coal tar pitch plastic described in the application of Norman Bilow filed herewith for Thermosetting Plastics and Method Therefor, Ser. No. 665,285. The polymers herein provided, in the soluble and fusible state, may be mixed with thermoplastic material, natural or synthetic rubber, tars, oils, pitches, bituminous material and soft tar distillation products or they may be reacted therewith to produce more thermally stable material, or otherwise provide plasticized mixtures of aromatic polyphenylene materials and coal tar pitch.

As the Friedel-Crafts catalysts of the present invention, we must employ strongly acidic metal halide catalysts or a strong Lewis acid catalyst, preferably such as aluminum chloride, and less preferably boron trifluoride, ferric chloride, zinc chloride, aluminum bromide, stannic chloride, antimony pentachloride, gallium tribromide, zirconium tetrachloride, tantalum pentachloride, and the like, or mixtures of the same. A preferred mixture is aluminum chloride and ferric chloride in combination with a feed of oxygen gas to the reactant mixture. The Friedel-Crafts type of reaction of the present invention may be conducted at temperatures ranging up to 180° C. but preferably is carried out in a temperature range on the order of 50° to 130° C.

As an improvement for increasing the temperature resistance it has been discovered that oxidation during processing is required in one embodiment of this invention, as hereinafter provided. Such oxidation can be provided by a feed of gaseous oxygen to the reaction mixture with or without the additional use of a solid oxidant compound in the reaction mixture.

The following examples are exemplary of the herein provided methods of polymerizing the indicated aromatic monomers to effect a commercial production of aromatic polymers and improved aromatic resins useful in commercial plastics:

EXAMPLE 1

A one liter resin flask fitted with a high torque stirrer, oil bath and gas addition tube was heated to 120° to 130° C. Nitrogen gas was passed through the flask to exclude air and into the flask were added:

biphenyl—77 grams, 0.50 mole.
m-terphenyl—115 grams, 0.50 mole.

When the contents were molten and thoroughly mixed, aluminum chloride, anhydrous (270 grams, 2.0 mole) was added all at once into the resin flask while nitrogen gas was bubbling through vigorously. Nitrogen gas was passed through the reaction mixture for 6 hours while the temperature was kept at 120°–130° C. The reaction mixture was added to hot concentrated hydrochloric acid to dissolve the aluminum salts. The polymeric material was washed several times with hot and then cold water, filtered and dried. It was then given a preliminary wash with naphtha and then subjected to a 2 step series of extraction process in a Soxhlet extraction apparatus. Below is a summary of the results obtained in terms of percent by weight of polymer fraction.

| Solvent used in extraction (in sequence) | Percent of polymer fraction |
|---|---|
| naphtha wash (initial) | 28 |
| 20% benzene—80% naphtha soluble | 44 |
| Chlorobenzene soluble | 18 |
| Chlorobenzene insoluble | 10 |

While one excludes air in the process described in Example 1, it has been discovered that air in fact is helpful in effecting the production of polymers which possess better heat resistance in the cured state.

EXAMPLE 2

A solution of curing agent was prepared by refluxing 180 grams of recrystallized p-xylylene glycol with 56.6 grams of p-toluenesulfonic acid monohydrate in 1500 milliliters of chloroform for 24 hours while removing water continually. Forty grams of the resin which was soluble in chlorobenzene and which is described in Example 1 were dissolved in 150 ml. of chloroform and 200 ml. of the above described curing agent solution was added. The resulting mixed solution was heated at reflux for 24 hours.

The solution which resulted was used to impregnate a conventional carbon cloth fabric (CCA–1). A resin content was obtained such that the resin percent was 39% after post-cure. Stocks of the impregnated fabric were molded in a preheated mold at 420° F. and 3000 p.s.i. pressure for two hours. Excellent molded shapes were secured which were postcured in an inert atmosphere by heating at 275° F. for 18 hours, the heat programmed from 250° to 550° F. over 108 hours, then heated at 550° F. for 6 hours.

As illustrated above, the aromatic monomer materials, as indicated, can be substituted one for the other in whole or in part in the above or following examples, to effect the production of soluble and fusible aromatic polymers. When such soluble and fusible aromatic polymers are cured, as illustrated in Example 2, they are discovered to afford commercially useful coating and molding resins which are resistant to normal and high temperature conditions.

However, where the resins of this invention are expected to perform under high temperature conditions, it is necessary to provide an oxidant in the processing, and we have discovered that improved aromatic and polyphenylene polymers capable of forming improved cured aromatic resins can be prepared in the presence of gaseous oxygen or diluted oxygen. The oxygen functions to aromatize the intermediate partially aromatic polymers as they are formed initially. The improvement provided by oxidation may be defined in terms of the following outstanding properties.

(1) They have excellent thermal stability in the cured state exhibiting negligible weight loss between 300°–400° C. in inert atmosphere.
(2) They have mean molecular weights prior to cure which range up to 5,000 or more.
(3) They are sufficiently soluble in certain common organic solvents especially when hot to permit their use in lacquers and varnishes.
(4) They are fusible and flow sufficiently at temperatures that are conventionally employed in hot molding presses to permit their fabrication in conventionally available equipment.
(5) The preferred polymers are fully aromatic and have carbon:hydrogen ratios on the order of 1.5.

The following examples are illustrative of methods of critically modifying the above process to produce fusible, soluble, curable polymers from the indicated monomers, or mixtures of monomers as described, to effect higher yields and a more suitable polymer material.

In order to obtain the oxygen environment in the Friedel-Crafts type of reaction of the present invention, oxygen gas ($O_2$) must be lead or forced into the reaction mixture. We have discovered that we may use pure oxygen or oxygen diluted with an inert gas such as nitrogen, helium, argon, mixtures thereof, and the like, or air may be used as the diluted form of oxygen provided that it is dry and substantially free from carbon dioxide.

Illustrative of the use of oxygen to effect the production of fusible soluble aromatic polymers and the formation of improved high temperature resistant resins thereof are the following examples:

EXAMPLE 3

Into a one-liter resin flask fitted with a high torque stirrer, gas inlet tube, gas outlet tube, and silicone oil bath for heating, were added:

biphenyl, practical grade—0.5 mole, 77 grams.
m-terphenyl, technical grade—0.5 mole, 115 grams.

The contents were melted and heated to 120° C. Then, aluminum chloride, technical grade, anhydrous (2.0 moles, 270 grams) were added all at once to the resin flask. The contents were heated to 120° C. and a vigorous stream of U.S.P. oxygen passed through the reaction mixture for about 1½ hours before discontinuing the flow of oxygen for the night. During the night, the reaction mixture was kept at 110°–120° C. The following day, the oxygen passage through the reaction mixture continued for an additional 4½ hours. Then the oxygen flow was discontinued and the reaction kept at 110°–120° C. for the second night.

Passage of oxygen through the reaction mixture was continued again in the morning for two hours, the reaction mixture temperature being kept at 120° C. At this stage, the reaction mixture was extremely viscous having the consistency of a heavy tar. The reaction mixture was triturated with hot concentrated hydrochloric acid, washed free of the acid with boiling water, dried at 140° C. in air. The weight was 181 grams which compares well with the theoretical yield of 182 grams. An initial wash with hot naphtha which removed unreacted monomers yielded a final weight of 162 grams. Thus, 19 grams, or 10.4% consisted of unreacted monomers and possibly other aromatic or reduced compounds of very low molecular weight.

The washed polymer was continuously extracted with naphtha containing 10% benzene by volume using a Soxhlet extraction apparatus and yielded 14 grams, or 7.8% (based on theoretical yield of polymer) soluble material and 147.8 grams, or 81.2% of insoluble polymer. The insoluble polymer was continuously extracted with chlorobenzene using the Soxhlet extraction apparatus and yielded 49.3 grams, or 27.1% of chlorobenzene soluble polymer and 103 grams, or 56.7% of chlorobenzene insoluble polymer.

Twenty grams of the chlorobenzene soluble polymer fraction was then dissolved in 50 ml. of boiling trichloroethylene. A curing agent solution was then prepared by reacting ten grams of 1,4-bis(hydroxymethyl)benzene with three grams of p-toluenesulfonic acid monohydrate in 100 ml. of chloroform at the boiling point (64° C.). The curing agent preparation was carried out for about 20 hours while removing water with an azeotropic trap.

The polyphenylene solution and the curing agent solution were then combined and heated at reflux for 20 hours. A portion of the reaction mixture was dried in vacuum. The dried product was then molded at 400° F. and 500–3,000 p.s.i. for two hours. It was then post-cured for 18 hours at 275° F., then heat programmed 108 hours from 275° F. to 550° F. and finally heated for six hours at 550° F. in an inert atmosphere to provide a smooth hard molded infusible, insoluble product capable of being cut and polished. The solution product provided an excellent impregnant and coating composition which gave laminates capable of withstanding high temperatures.

A further method illustrative of a modification of the above process is provided as follows:

EXAMPLE 4

Into a one-liter resin flask fitted with a high torque stirrer, hot oil bath and gas inlet tube were placed biphenyl (77 g., 0.5 mole); m-terphenyl (115 g., 0.5 mole); and aluminum chloride (270 g., 2.0 moles), and the oil bath was brought to 100–110° C. After solution was effected, anhydrous cupric chloride (26.9 g., 0.2 mole) was added over a ten-minute period. Oxygen was bubbled vigorously through the reaction mixture for approximately nine hours while the temperature was kept at 110–120° C. The reaction mixture was cooled, washed with concentrated hydrochloric acid, given a preliminary wash with naphtha and the crude polymer (175 g.) extracted with naphtha containing 10% by volume benzene yielding 126 g. of insoluble polymer.

This insoluble portion was then continuously extracted with chlorobenzene yielding 68 g. of chlorobenzene-soluble portion (35% of theoretical polyphenylene resin) and 58 g. of chlorobenzene insoluble portion (30% of theoretical polyphenylene). An elemental analysis of the chlorobenzene soluble resin showed that C, H and Cl constituted 98.9% of the constituents and 0.8% was ash. This shows that relatively little oxygen is incorporated into the structure of the polymer. The carbon: hydrogen atom ratio of the chlorobenzene soluble resin was calculated to be 1.51.

Twenty grams of the chlorobenzene-soluble polymer fraction was then dissolved in 50 ml. of boiling trichloroethylene. A curing agent solution was then prepared by reacting 10 grams of 1,4-bis(hydroxymethyl) benzene with 3 grams of p-toluenesulfonic acid mono-hydrate in 100 ml. of chloroform at the boiling point (64° C.). The curing agent preparation was carried out for about 20 hours while removing water with an azeotropic trap.

The polyphenylene solution and the curing agent solution were then combined and heated at reflux for 20 hours. A portion of the reaction mixture was dried in vacuum. The dried product was then molded at 400° F. and 500–3,000 p.s.i. for two hours. It was then post-cured for 18 hours at 275° F., then heat programmed 108 hours from 275° F. to 550° F. and finally for six hours at 550° F.

EXAMPLE 5

Into a one-liter resin flask fitted with a high torque stirrer, hot oil bath, and gas inlet tube were placed naphthalene (128 g., 1.0 mole) and aluminum chloride (270 g., 2.0 moles), and the oil bath brought to 100–110° C. After solution was effected, anhydrous cupric chloride (26.9 g., 0.2 mole) was added over a ten-minute period. Oxygen was bubbled vigorously through the reaction mixture for approximately nine hours while the temperature was kept at 110–120° C. The reaction mixture was cooled, washed with concentrated hydrochloric acid then water, given a preliminary wash with naphtha and the crude polymer (125 g.) extracted with naphtha containing 15% by volume of benzene yielding 100 g. of insoluble polymer.

This insoluble portion was then continuously extracted with hot chlorobenzene yielding 50 g. of chlorobenzene soluble portion and 50 g. of chlorobenzene insoluble portion. An elemental analysis showed that relatively little oxygen had been incorporated into the polymer.

Twenty grams of the chlorobenzene soluble polymer fraction was dissolved in 50 ml. of boiling chlorobenzene. A curing agent solution was prepared by reacting 10 grams of 1,4-bis(hydroxymethyl)benzene with three grams of p-toluenesulfonic acid monohydrate in 100 ml. of chloroform at the boiling point. The curing agent preparation was carried out for about twenty hours while removing water with an azeotropic trap.

The polyphenylene solution prepared above and the curing agent were combined and heated at reflux for 20 hours. A portion of the reaction mixture was dried in vacuum. The dried product then was molded at 400° F. and 3,000 p.s.i. for two hours. It then was post-cured for 18 hours at 275° F., then heat programmed 108 hours from 275° F. to 550° F. and finally for six hours at 550° F. in an inert atmosphere. Excellent molded shapes were secured which were shiny, having taken the finish of the mold during the molding and pressing process.

EXAMPLE 6

Into a one-liter resin flask fitted with a stirrer, oil bath and gas inlet tube were placed 178 g. of anthracene, and 270 g. of aluminum chloride, and the oil bath brought to 110° C. The mixture was stirred vigorously and oxygen was bubbled rapidly through the reaction mixture for approximately 8½ hours while the temperature was kept at 115° C. The reaction mixture was cooled, washed with concentrated hydrochloric acid then with water, given a preliminary wash with naphtha and the crude polymer (170 g.) extracted with naphtha containing 15% by volume of benzene yielding 145 g. of insoluble polymer.

The insoluble portion was then continuously extracted with chlorobenzene yielding 120 g. of chlorobenzene soluble polymer and a residue of chlorobenzene insoluble material. An elemental analysis of this product showed that very little oxygen had been incorporated into the polymer chain.

About 20 g. of the chlorobenzene soluble polymer was dissolved in 50 ml. of chlorobenzene. A curing agent solution was prepared by reacting 10 g. of 1,4-bis(hydroxymethyl) benzene with 3 g. of p-toluenesulfonic acid monohydrate in 100 ml. of chloroform at the boiling point. The curing agent preparation was carried out for approximately 20 hrs.

The polyphenylene solution and the curing agent were then combined and the mixture was heated at reflux for 20 hrs. A portion of the reaction mixture was dried in vacuum. The dried product then was molded at 400° F. and 500–3000 p.s.i. for 2 hours. It then was post-cured to yield a well molded, well shaped article having high surface luster.

EXAMPLE 7

A one-liter resin flask fitted with a stirrer, oil bath, and gas addition tube was heated to 120° C. Nitrogen gas was passed through the flask to exclude air and into the flask was added 77 g. (0.5 mole) biphenyl and 64 g. (0.5 mole) naphthalene. When the contents of the flask were molten aluminum chloride anhydrous (270 g., 2.0 moles) was added all at once into the resin flask while nitrogen gas was bubbled through vigorously. Nitrogen gas was passed through the reaction mixture for six hours while the temperature was kept at 120° C. The reaction mixture was added to hot concentrated hydrochloric acid to dissolve the aluminum salts. The polymeric material was washed several times with hot and then cold water, filtered and dried. It then was given a preliminary wash with naphtha and then subjected to an extraction in a Soxhlet extraction apparatus. Initial extraction was accomplished with naphtha containing 15% of benzene to yield 130 g. of insoluble residue. This insoluble residue then was extracted with chlorobenzene, at the boiling point. 100 g. of soluble polymer was obtained leaving 30 g. of chlorobenzene insoluble material.

EXAMPLE 8

A solution of curing agent was prepared by refluxing 180 g. of recrystallized p-xylylene glycol with 56.6 g. of p-toluenesulfonic acid monohydrate in 1050 ml. of chloroform for 24 hours. Forty grams of the resin which was soluble in chlorobenzene and which is described in Example 7, was dissolved in 150 ml. of chloroform and 200 ml. of the above described curing agent solution was added. The resulting mixture was heated at reflux for 24 hours.

The solution which resulted was used to impregnate a conventional (CCA-1) carbon cloth fabric. A resin content was obtained such that the resin percent was 38% after postcure. Stacks of the impregnated fabric were molded in a preheated mold at 420° F. and 3000 p.s.i. pressure for two hours. Excellent molded shapes were secured which were post-cured by heating at 275° F. for 18 hours, then temperature programmed from 250 to 550° F. over 108 hours, then at 550° F. for six hours in an inert atmosphere.

In the above examples the strong Lewis acid polymerization catalyst is an actual catalyst that may be employed in amounts less than the stoichiometry which the reaction calls for. However, the use of greater than catalytic quantities is not precluded and may even be beneficial. The Lewis acid catalyst must be one that is classed as a strong Lewis acid and is preferably in anhydrous form for best results. As the strength of the Lewis acid catalyst falls off from the strongest available, then the reaction rate of the process of the present invention falls off sharply. The catalytic oxidant employed in the process of the present invention and improvement can be employed in small catalytic quantities equal to or less than the amount of Lewis acid catalyst used, although greater amounts can be employed if so desired without adversely affecting the compositions of this invention. One of the most efficient oxidizing catalysts for this process is cupric chloride, preferably in anhydrous form. Other halide salts of copper may also be employed, as cupric bromide, cupric iodide. Other oxidizing agents that can be used in combination with the gaseous oxygen are cupric oxide, silver oxide, vanadium pentoxide, mixtures of the same, and the like. Besides oxides and halides, other anionic combinations with these cations such as sulphates can be used in combination with the gaseous oxygen as the oxidizing catalyst.

Further examples of curing agent material for use with the above prepared aromatic polymers are provided in the copending applications "Aromatic Resinous Curing System and Method," Ser. No. 665,303, and "The Method of Producing New Aromatic Resins and Products Thereof," Ser. No. 665,269, by Leroy Miller and Norman Bilow.

Having described the present embodiments of our discovery in accordance with the patent statutes, it will now be apparent that some modifications and variations may be made without departing from the spirit and scope thereof. The specific embodiments described are provided by way of illustration and are illustrative of our discovery, invention or improvement.

What is claimed is:
1. A method of preparing soluble and fusible aromatic polymers comprising the steps of:
   (1) forming a reaction mixture of:
      (a) an aromatic monomer material selected from the group consisting of anthracene, naphthalene, phenanthrene, biphenyl, terphenyl, quaterphenyl, mixtures thereof and mixtures therewith with other fused and/or non-fused ring aromatic monomers containing not more than 5 aromatic rings;
      (b) a strong Lewis acid, anhydrous metal halide polymerization catalyst selected from the group consisting of aluminum chloride, boron trifluoride, ferric chloride, zinc chloride, aluminum bromide, stannic chloride, antimony pentachloride, gallium tribromide, zirconium tetra- chloride, tantalum pentachloride and mixtures thereof;

(2) heating the mixture to a temperature between 50° C. to 130° C.;

(3) forcing gaseous oxygen into the heated reaction mixture; and (4) recovering a fusible polymer, essentially soluble in chlorinated solvent and essentially insoluble in water.

2. The method of claim 1 including the step of adding a solid oxidant selected from the group consisting of anhydrous oxidation effecting copper, silver, vanadium and iron salts, to the reaction mixture.

3. The method of claim 1 wherein the temperature of the reaction mixture is maintained on the order of 100°–130° C. during the formation of said soluble and fusible aromatic polymers.

4. The method of claim 2 wherein said added solid oxidant is selected from the group consisting of oxidation effecting cupric chloride, cupric bromide, cupric oxide, silver oxide, vanadium pentoxide, and mixtures of the same.

5. The method of claim 1 wherein the strong Lewis acid metal halide catalyst is anhydrous aluminum chloride.

6. The method of claim 2 wherein the solid oxidant is ferric chloride.

References Cited

UNITED STATES PATENTS

| | | | |
|---|---|---|---|
| 3,159,589 | 12/1964 | Bloomfield et al. | 260—2 |
| 3,431,221 | 3/1969 | Hoess | 260—2 |
| 3,480,568 | 11/1969 | Weichman et al. | 260—2 |

FOREIGN PATENTS

| | | | |
|---|---|---|---|
| 1,000,679 | 8/1965 | Great Britain | 260—2 |
| 2,280 | 2/1967 | Japan | 260—2 |

OTHER REFERENCES

Badische Anilin & Soda Fabrik, Dutch application 6,404,921, printed November 1964.

Borg-Warner Corp., Dutch application 6,609,825, printed January 1967 (67 Chem. Abstracts 11979k).

Berlin et al., 67 Chem Abstracts 82422j (1967).

Beck, "Berichte der Deutschen Bunsen Gesellschaft für Physikalische Chemie," vol. 68, No. 6, August 1964, pp. 558–567 (62 Chem. Abstracts 13261).

Kovacic et al., "Jour. Organic Chemistry," vol. 29, August 1964, pp. 2416–2420.

Bilow et al., "Jour. Macromol. Science (Chem.)," vol. A1(1), Mar. 29, 1967, pp. 183–197.

SAMUEL H. BLECH, Primary Examiner

U.S. Cl. X.R.

117—161; 161—182; 260—3, 28, 33.6, 33.8, 79.3